United States Patent
Snyder et al.

(10) Patent No.: US 11,525,577 B2
(45) Date of Patent: Dec. 13, 2022

(54) EXTENDED BULKHEAD PANEL

(71) Applicant: RAYTHEON TECHNOLOGIES CORPORATION, Farmington, CT (US)

(72) Inventors: Timothy S. Snyder, Glastonbury, CT (US); James B. Hoke, Tolland, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 24 days.

(21) Appl. No.: 16/859,204

(22) Filed: Apr. 27, 2020

(65) Prior Publication Data
US 2021/0332979 A1    Oct. 28, 2021

(51) Int. Cl.
*F23R 3/00* (2006.01)
*F23R 3/14* (2006.01)

(52) U.S. Cl.
CPC .............. *F23R 3/002* (2013.01); *F23R 3/007* (2013.01); *F23R 3/14* (2013.01)

(58) Field of Classification Search
CPC .. F23R 3/002; F23R 3/007; F23R 3/14; F23R 2900/00017
See application file for complete search history.

(56) References Cited

U.S. PATENT DOCUMENTS

| | | | |
|---|---|---|---|
| 4,365,470 A * | 12/1982 | Matthews | F23R 3/283 60/800 |
| 4,567,730 A | 2/1986 | Scott | |
| 4,916,905 A * | 4/1990 | Havercroft | F23R 3/002 60/756 |
| 5,479,772 A | 1/1996 | Halila | |
| 6,434,926 B1 * | 8/2002 | Dean | F23R 3/002 60/804 |
| 8,938,970 B2 | 1/2015 | Gerendas et al. | |
| 9,625,152 B2 | 4/2017 | Papple et al. | |
| 10,168,052 B2 | 1/2019 | Chang et al. | |
| 10,378,775 B2 * | 8/2019 | Patel | F23R 3/60 |
| 2002/0184887 A1 | 12/2002 | Calvez et al. | |
| 2007/0084213 A1 * | 4/2007 | Burd | F23R 3/50 60/776 |
| 2007/0107710 A1 | 5/2007 | De Sousa | |
| 2008/0236169 A1 * | 10/2008 | Hawie | F23R 3/10 60/779 |
| 2014/0360196 A1 * | 12/2014 | Graves | F23R 3/007 60/753 |
| 2015/0135720 A1 * | 5/2015 | Papple | F23R 3/60 60/759 |

(Continued)

OTHER PUBLICATIONS

European Patent Office, European Search Report dated Oct. 1, 2021 in Application No. 21169739.6.

*Primary Examiner* — Arun Goyal
*Assistant Examiner* — Henry Ng
(74) *Attorney, Agent, or Firm* — Snell & Wilmer L.L.P.

(57) ABSTRACT

A combustor may comprise an outer combustor panel and an inner combustor panel radially inward of the outer combustor panel. A bulkhead panel may extend radially between the outer combustor panel and the inner combustor panel. An outer spacer may be located between an outer flange of the bulkhead panel and the outer combustor panel. An inner spacer may be located between an inner flange of the bulkhead panel and the inner combustor panel.

10 Claims, 8 Drawing Sheets

(56) References Cited

U.S. PATENT DOCUMENTS

| | | | |
|---|---|---|---|
| 2015/0362191 A1* | 12/2015 | Papple | F23R 3/002 |
| | | | 60/772 |
| 2016/0273773 A1 | 9/2016 | Eastwood et al. | |
| 2016/0298841 A1* | 10/2016 | Papple | F23R 3/04 |
| 2017/0059167 A1 | 3/2017 | Bloom | |
| 2017/0191664 A1* | 7/2017 | Bennett | F23R 3/002 |
| 2018/0094812 A1* | 4/2018 | Corsmeier | F23R 3/007 |
| 2018/0094814 A1* | 4/2018 | Proscia | F23R 3/286 |
| 2018/0363903 A1 | 12/2018 | Dziech | |
| 2019/0137101 A1 | 5/2019 | Bloom | |
| 2020/0309374 A1* | 10/2020 | Hucker | F23R 3/283 |

* cited by examiner

EXTENDED BULKHEAD PANEL

FIELD

The present disclosure relates to combustors, and, more specifically, to extended bulkhead panels.

BACKGROUND

A gas turbine engine includes a fan section, a compressor section, a combustor section, and a turbine section. The fan section may drive air along a bypass flowpath while the compressor section may drive air along a core flowpath. In general, during operation, air is pressurized in the compressor and then mixed with fuel and ignited in the combustor to generate combustion gases. The combustion gases flow through the turbine, which extracts energy from the combustion gases to power the compressor and generate thrust.

The combustor typically includes panels, which may line the inner and outer combustor shells and provide thermal protection. A bulkhead panel may be located at the forward end of the combustor. Current bulkhead panels are generally comprised of metal. To protect the metal panel from the high temperature combustion gases, cooling fluid may be provided through effusion holes formed through the bulkhead panel. Combustors typically include swirlers to provide turbulent air that is mixed with fuel to improve fuel atomization. The effusion airflow from the bulkhead panel can negatively affect the flow patterns generated by the swirlers.

SUMMARY

A combustor is disclosed herein. In accordance with various embodiments, the combustor may comprise an outer combustor panel and an inner combustor panel radially inward of the outer combustor panel. A bulkhead panel may extend radially between the outer combustor panel and the inner combustor panel. An outer spacer may be located between an outer flange of the bulkhead panel and the outer combustor panel. An inner spacer may be located between an inner flange of the bulkhead panel and the inner combustor panel.

In various embodiments, the outer spacer may apply a first biasing force in a radially inward direction against an exterior surface of the outer flange, and the inner spacer may apply a second biasing force in a radially outward direction against the exterior surface of the inner flange.

In various embodiments, a first forward end of the outer combustor panel may be located in a first groove defined by the outer spacer, and a second forward end of the inner combustor panel may be located in a second groove defined by the inner spacer. In various embodiments, the bulkhead panel may define a swirler opening.

In various embodiments, the bulkhead panel may be formed of a ceramic matrix composite. In various embodiments, the ceramic matrix composite may extend continuously and without interruption from an interior surface of the bulkhead panel and to an exterior surface of the bulkhead panel and from the swirler opening to an outer perimeter of the bulkhead panel.

In various embodiments, at least one of the outer combustor panel or the inner combustor panel may be formed of at least one a nickel based alloy or a cobalt based alloy.

In various embodiments, a bulkhead shell may be located forward the bulkhead panel. The bulkhead shell may define a plurality of effusion openings configured to direct a flow of fluid toward an exterior surface of the bulkhead panel. In various embodiments, a ratio of an axial length of the outer flange to radial distance between the outer flange and the swirler opening may be between 0.5:1 and 1.5:1.

A method for assembly of a combustor is also disclosed herein. In accordance with various embodiments, the method may comprise the steps of locating a bulkhead panel over an interior surface of a bulkhead shell, locating a swirler through a swirler opening defined by the bulkhead panel and through a shell opening defined by the bulkhead shell, coupling a combustor inner shell to an inner flange of the bulkhead panel, coupling a combustor outer shell to an outer flange of the bulkhead panel, and coupling a hood to the combustor outer shell and the combustor inner shell.

In various embodiments, the step of coupling the combustor inner shell to the inner flange of the bulkhead panel may comprise compressing an inner spacer between an exterior surface of the inner flange and an interior surface of an inner combustor panel coupled to the combustor inner shell.

In various embodiments, the step of coupling the combustor outer shell to the outer flange of the bulkhead panel may comprise compressing an outer spacer between the exterior surface of the outer flange and an interior surface of an outer combustor panel coupled to the combustor outer shell.

In various embodiments, the method may further comprise the steps of coupling the inner spacer to a forward end of the inner combustor panel, and coupling the outer spacer to a forward end of the outer combustor panel.

In various embodiments, the bulkhead panel may comprise a plurality of arcuate bulkhead panel segments. In various embodiments, the may further comprise the steps of coupling the plurality of arcuate bulkhead panel segments together using a temporary panel retainer, and removing the temporary panel retainer after coupling the combustor inner shell to the inner flange of the bulkhead panel.

In various embodiments, a first arcuate bulkhead panel segment of the plurality of arcuate bulkhead panel segments may be formed of a ceramic matrix composite, and the ceramic matrix composite may extend continuously and without interruption from the swirler opening to an outer perimeter of the first arcuate bulkhead panel segment.

A bulkhead panel for a combustor is also disclosed herein. In accordance with various embodiments, the bulkhead panel may comprise a bulkhead panel segment formed of a ceramic matrix composite, an outer flange extending axially from an outer diameter of the bulkhead panel segment, and an inner flange extending axially from an inner diameter of the bulkhead panel segment.

In various embodiments, the bulkhead panel segment may define a swirler opening, and the ceramic matrix composite may extend continuously and without interruption from the swirler opening to an outer perimeter of the bulkhead panel segment.

In various embodiments, an outer spacer may be attached to the outer flange. The outer spacer may be configured to apply a first biasing force against the outer flange in a radially inward direction. An inner spacer may be attached to the inner flange. The inner spacer may be configured to apply a second biasing force against the inner flange in a radially outward direction.

In various embodiments, the bulkhead panel segment may be configured to extend 360° about an engine central longitudinal axis.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that logical aerodynamic, thermodynamic, and mechanical changes may be made without departing from the spirit and scope of the disclosure. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected, or the like may include permanent, removable, temporary, partial, full, and/or any other possible attachment option. Additionally, any reference to without contact (or similar phrases) may also include reduced contact or minimal contact.

Cross hatching lines may be used throughout the figures to denote different parts but not necessarily to denote the same or different materials. Throughout the present disclosure, like reference numbers denote like elements. Accordingly, elements with like element numbering may be shown in the figures, but may not necessarily be repeated herein for the sake of clarity.

As used herein, "aft" refers to the direction associated with the tail (e.g., the back end) of an aircraft, or generally, to the direction of exhaust of the gas turbine engine. As used herein, "forward" refers to the direction associated with the nose (e.g., the front end) of an aircraft, or generally, to the direction of flight or motion.

A first component that is "radially outward" of a second component means that the first component is positioned at a greater distance away from the engine central longitudinal axis than the second component. A first component that is "radially inward" of a second component means that the first component is positioned closer to the engine central longitudinal axis than the second component. In the case of components that rotate circumferentially about the engine central longitudinal axis, a first component that is radially inward of a second component rotates through a circumferentially shorter path than the second component. The terminology "radially outward" and "radially inward" may also be used relative to references other than the engine central longitudinal axis.

Figure 1:
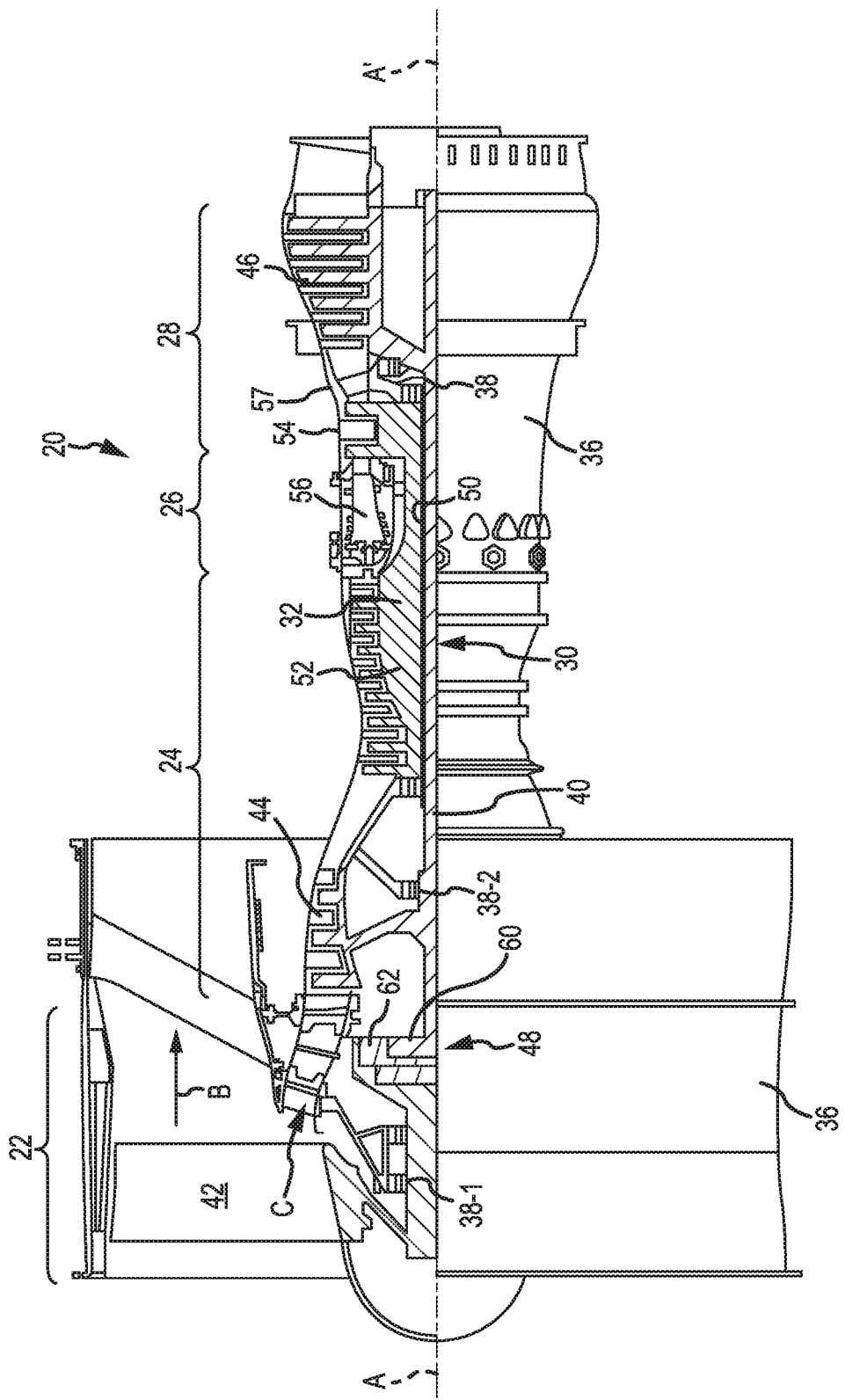
FIG. 1 illustrates a cross-sectional view of an exemplary gas turbine engine, in accordance with various embodiments.

With reference to FIG. 1, a gas turbine engine 20 is provided, in accordance with various embodiments. Gas turbine engine 20 may be a two-spool turbofan that generally incorporates a fan section 22, a compressor section 24, a combustor section 26, and a turbine section 28. In operation, fan section 22 drives fluid (e.g., air) along a bypass flow-path B while compressor section 24 can drive air along a core flow-path C for compression and communication into combustor section 26 then expansion through turbine section 28. Although depicted as a turbofan gas turbine engine 20 herein, it should be understood that the concepts described herein are not limited to use with turbofans as the teachings may be applied to other types of turbine engines including multi-spool architectures, as well as industrial gas turbines.

Gas turbine engine 20 generally comprises a low speed spool 30 and a high speed spool 32 mounted for rotation about an engine central longitudinal axis A-A' relative to an engine static structure 36 via several bearing systems 38, 38-1, and 38-2. Engine central longitudinal axis A-A' is oriented in the z direction on the provided x-y-z axes. It should be understood that various bearing systems 38 at various locations may alternatively or additionally be provided, including for example, bearing system 38, bearing system 38-1, and bearing system 38-2.

Low speed spool 30 may generally comprise an inner shaft 40 that interconnects a fan 42, a low pressure compressor 44 and a low pressure turbine 46. Inner shaft 40 may be connected to fan 42 through a geared architecture 48 that can drive fan 42 at a lower speed than low speed spool 30. Geared architecture 48 may comprise a gear assembly 60 enclosed within a gear housing 62. Gear assembly 60 couples inner shaft 40 to a rotating fan structure. High speed spool 32 may comprise an outer shaft 50 that interconnects a high pressure compressor 52 and high pressure turbine section 54. A combustor 56 may be located between high pressure compressor 52 and high pressure turbine 54. In various embodiments, engine static structure 36 may include a mid-turbine frame 57. The mid-turbine frame 57, if included, may be located generally between high pressure turbine 54 and low pressure turbine 46. Mid-turbine frame 57 may support one or more bearing systems 38 in turbine section 28. Inner shaft 40 and outer shaft 50 may be concentric and rotate via bearing systems 38 about the engine central longitudinal axis A-A', which is collinear with their longitudinal axes. As used herein, a "high pressure" compressor or turbine experiences a higher pressure than a corresponding "low pressure" compressor or turbine.

The core airflow C may be compressed by low pressure compressor 44 then high pressure compressor 52, mixed and burned with fuel in combustor 56, then expanded through the high pressure turbine 54 and low pressure turbine 46. Turbines 46, 54 rotationally drive the respective low speed spool 30 and high speed spool 32 in response to the expansion.

Figure 2:
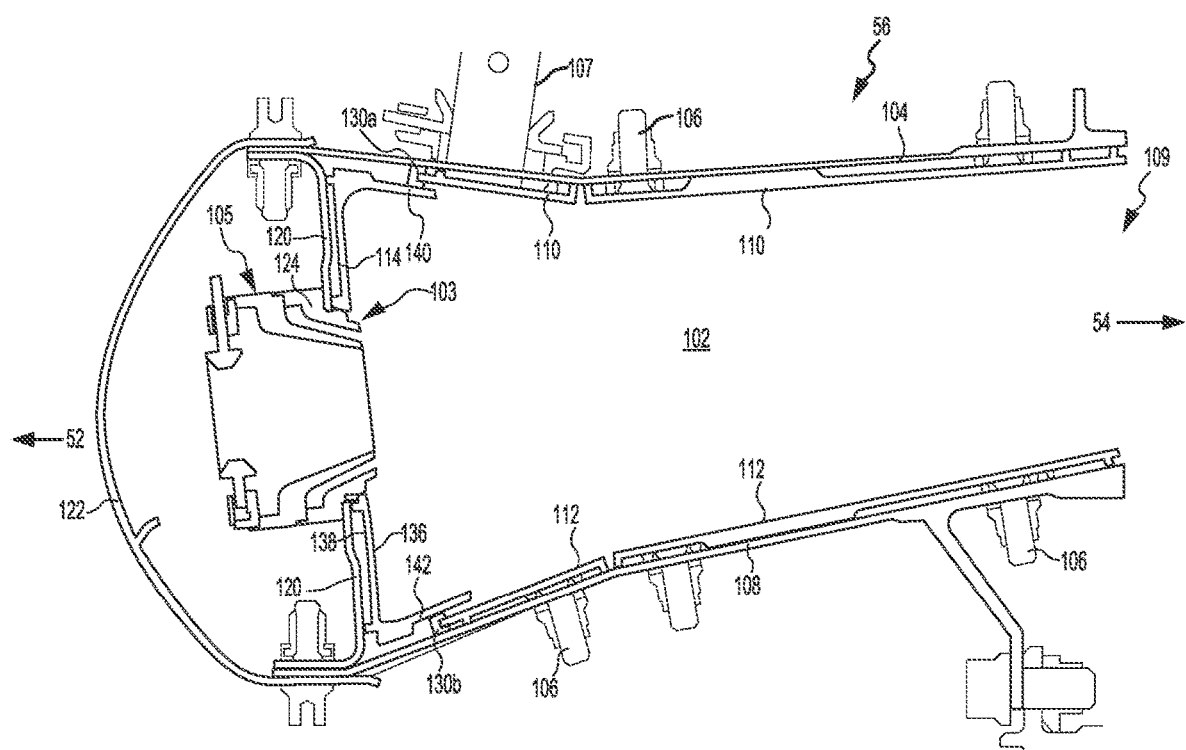
FIG. 2 illustrates a cross-sectional view of an exemplary combustor, in accordance with various embodiments.

FIG. 2 shows an exemplary cross-section of combustor 56 positioned between high pressure compressor 52 and high pressure turbine 54 of a gas turbine engine 20. Combustor 56 includes a combustion chamber 102 defined by a combustor outer shell 104 and a combustor inner shell 108. Combustor inner shell 108 is radially inward of combustor outer shell 104. Combustor outer shell 104 and combustor inner shell 108 may provide structural support to combustor 56 and its components. Combustor outer shell 104 and combustor inner shell 108 may comprise cylindrical-shaped or conically shaped annular structures located concentrically about engine central longitudinal axis A-A'. A bulkhead shell 120 may be positioned at a forward end of combustion chamber 102. Bulkhead shell 120 extends radially between combustor outer shell 104 and combustor inner shell 108. Combustor 56 further includes an annular hood 122 and a plurality of swirlers 124 (one shown). In various embodiments, hood 122 and bulkhead shell 120 may be coupled to combustor outer shell 104 and combustor inner shell 108. Swirlers 124 may be located through openings defined by bulkhead shell 120.

Combustion chamber 102 may form a region for mixing of air flowing through core flow-path C (with brief reference to FIG. 1) and fuel. Combustion chamber 102 may be configured to direct the high-speed exhaust gases produced by the ignition of the fuel air mixture inside the combustor 56. The fuel and air mixture may be injected at an inlet 103 of combustion chamber 102 by an axial fuel injection system 105 located the forward end of combustion chamber 102. In various embodiments, combustor 56 may also include one or more radial fuel injectors 107 located through combustor outer shell 104 and/or through combustor inner shell 108. The high-speed exhaust gases may be driven downstream within the combustor 56 towards a combustor outlet 109. Combustor outlet 109 may be located forward of a first vane stage of high pressure turbine 54.

Swirlers 124 may be configured to generate a swirling airflow at the forward end of the combustion chamber 102. For example, and with momentary reference to FIG. 3, swirlers 124 may cause a portion 128*a* of the fluid flow 128 injected at inlet 103 to flow in generally radially outward and forward direction. Swirlers 124 also cause may a portion 128*b* of the fluid flow 128 injected at inlet 103 to flow in generally radially inward and forward direction. Generating flow portions 128*a*, 128*b* (referred to herein collectively as "reverse flow 128*a*, 128*b*") may improve fuel atomization and/or stabilize the flame within combustion chamber 102. In this regard, reverse flow 128*a*, 128*b* tends to improve the fuel burn within combustion chamber 102 and may reduce NOx emission and/or increase the lean blowout limits of gas turbine engine 20.

It may be desirable to protect combustor outer shell 104, combustor inner shell 108, and bulkhead shell 120 from the high temperatures, flames, and/or combustion gases within combustion chamber 102. Accordingly, one or more combustor panels (also referred to as thermal shields or combustor liners) may be disposed inside combustion chamber 102 and may provide such thermal protection. In accordance with various embodiments, combustor 56 includes, one or more outer combustor panel(s) 110, one or more inner combustor panel(s) 112, and one or more bulkhead combustor panel(s) 114. Outer combustor panel(s) 110 are located over and/or on an interior surface of combustor outer shell 104. Stated differently, outer combustor panel(s) 110 are located radially inward of combustor outer shell 104. Inner combustor panel(s) 112 are located over and/or on an interior surface of combustor inner shell 108. Stated differently, inner combustor panel(s) 112 are located radially outward of combustor inner shell 108. Bulkhead combustor panel 114 (referred to herein as bulkhead panel 114) is located over and/or on an interior surface of bulkhead shell 120. Stated differently, bulkhead panel 114 is located aft of bulkhead shell 120. As used herein, an "interior surface" refers to a surface of a combustor shell or a combustor panel that is oriented toward the combustion chamber 102, and an "exterior surface" refers to a surface of a combustor shell or a combustor panel that is oriented generally away from the combustion chamber 102 and generally opposite the interior surface.

In various embodiments, fasteners 106 may couple outer combustor panels 110 and inner combustor panels 112 to combustor outer shell 104 and combustor inner shell, respectively. Fasteners 106 may comprise threaded studs, nuts and bolts, clips, rivets, or any other suitable securement mechanism. As described in further detail below, bulkhead panel 114 may be secured in place via spacers outer spacers 130*a* and inner spacers 130*b*.

Figure 3A:
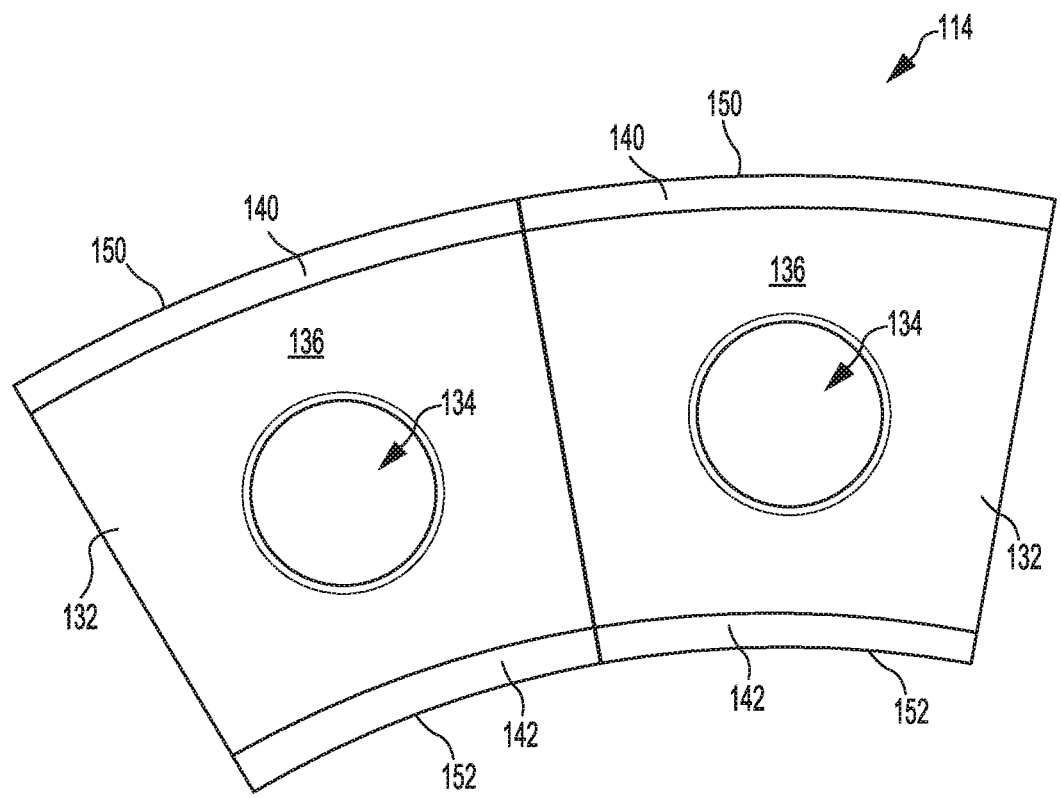
FIG. 3A illustrates a portion of an extended bulkhead panel, in accordance with various embodiments.
Figure 3B:
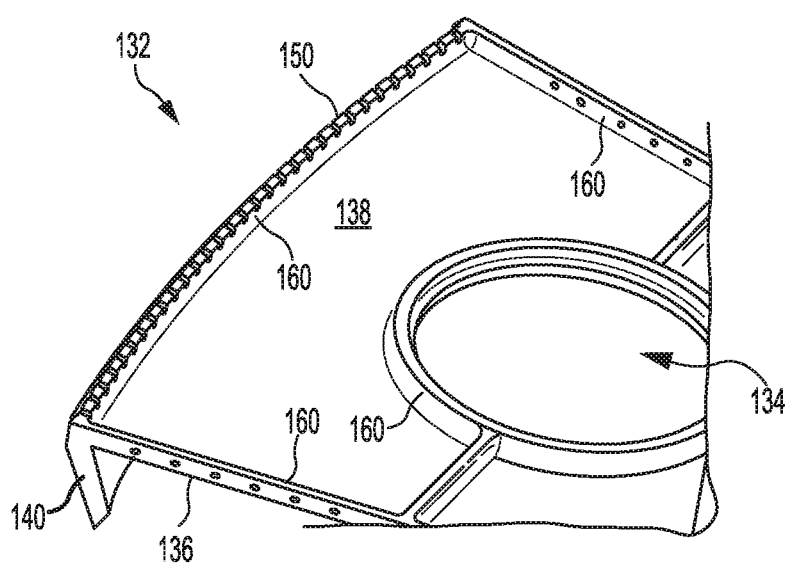
FIG. 3B illustrates a portion of an extended bulkhead panel segment, in accordance with various embodiments.

Bulkhead shell 120 and bulkhead panel 114 may be circumferentially distributed about the engine central longitudinal axis A-A'. Referring now to FIGS. 3A and 3B, and with continued reference to FIG. 2, In various embodiments, bulkhead panel 114 may comprise a plurality of circumferentially adjacent arcuate bulkhead panel segments 132. Bulkhead panel segments 132 each define, at least one, swirler opening 134 through which a swirler 124 (FIG. 2) may be located. In various embodiments, bulkhead panel 114 may comprise a single bulkhead panel segment 132 extending 360° about the engine central longitudinal axis A-A'. Each bulkhead panel segment 132 comprises an interior surface 136 and exterior surface 138 opposite interior surface 136.

In accordance with various embodiments, bulkhead panel 114 may comprise an "extended bulkhead panel". In this regard, bulkhead panel segment(s) 132 may each comprise an outer flange 140 and an inner flange 142. Outer flange 140 is located at an outer diameter (OD) 150 of the bulkhead panel segment 132. Inner flange 142 is located at an inner diameter (ID) 152 of the bulkhead panel segment 132. ID 152 is located proximate combustor inner shell 108. OD 150 is located proximate combustor outer shell 104. In various embodiments, bulkhead panel segment 132 may include one or more rails 160 extending from exterior surface 138. Rails 160 may contact the interior surface of bulkhead shell 120.

Combustor panels 110, 112, 114 may be made of any suitable heat tolerant material. In this regard, the combustor panels 110, 112, 114 may be substantially resistant to thermal mechanical fatigue in order to inhibit cracking of the combustor panels and/or to inhibit liberation of portions of the combustor panels. In various embodiments, the combustor panels 110, 112, 114 may be made from a nickel based alloy and/or a cobalt based alloy, among others. For example, the combustor panels 110, 112, 114 may be made from a high performance nickel-based super alloy. In various embodiments, the combustor panels 110, 112, 114 may be made from a cobalt-nickel-chromium-tungsten alloy. In various embodiments, bulkhead panel 114 may be made of a material different from the material of outer combustor panel 110 and inner combustor panel 112. In various embodiments, bulkhead panel 114 may be made of ceramic matrix composite ceramic matrix composite (CMC) and outer and inner combustor panels 110, 112 may be made of metal or metal alloy (e.g., a nickel based alloy and/or a cobalt based alloy). The increased thermal resistance of CMC may allow for reduced cooling of the bulkhead panel. For example, the thermal properties of CMC reduce the need for cooling film along interior surface 136 and about swirler opening 134. In this regard, in various embodiments, bulkhead panel 114 may be formed devoid of effusion holes extending between interior surface 136 and exterior surface 138. Stated differently, the CMC of bulkhead panel 114 may extend continuously, without interruption, from interior surface 136 and exterior surface 138 and from swirler opening 134 to the outer perimeter (or outer edges) of the bulkhead panel segment 132.

Figure 4:
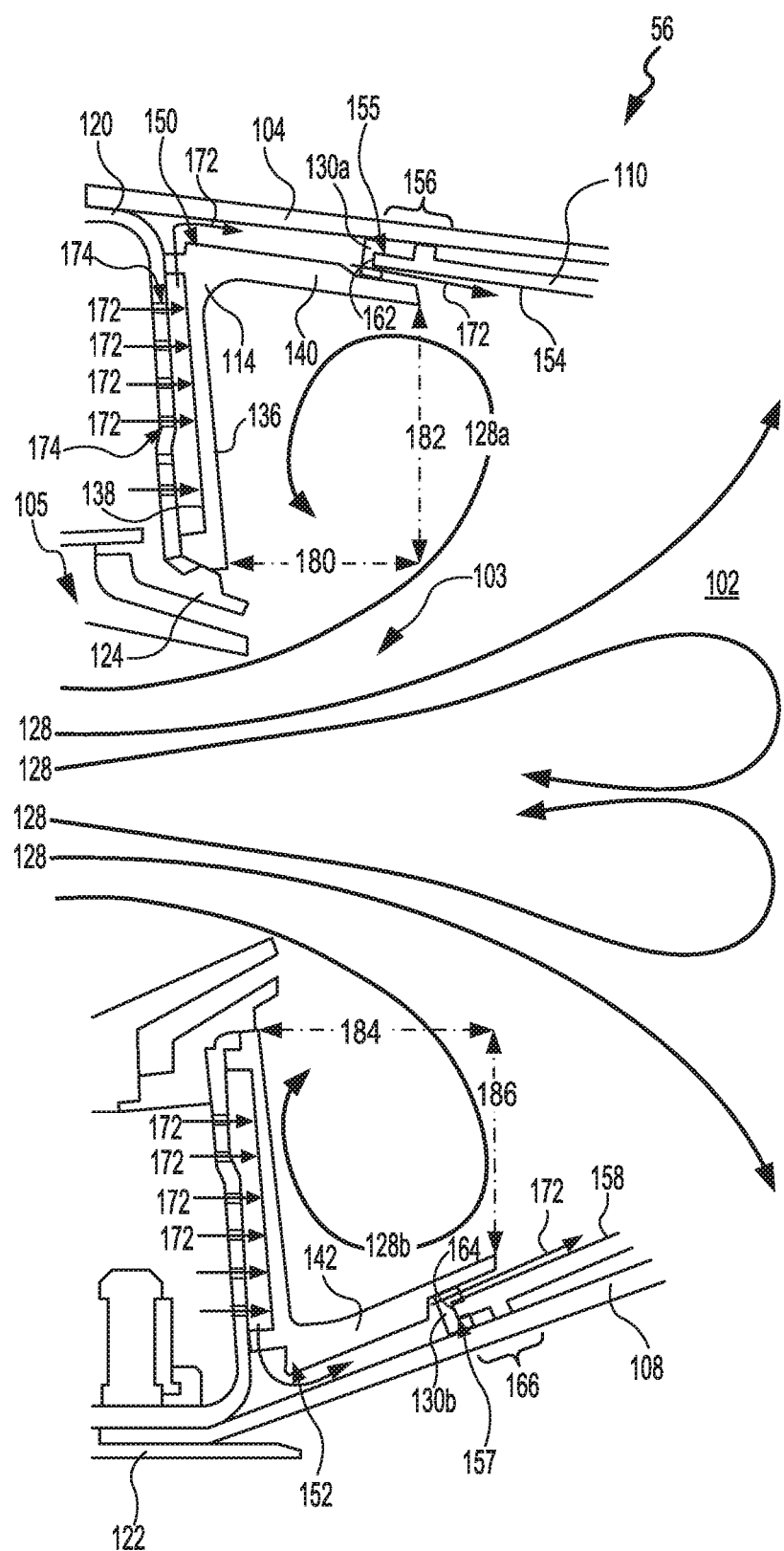
FIG. 4 illustrates a cross-sectional view of an extended bulkhead panel located at the forward end of the combustion chamber, in accordance with various embodiments.

With reference to FIG. 4, and continuing reference to FIG. 2, outer and inner flanges 140, 142 extend axially and aft. The exterior surface 138 of outer flange 140 radially overlaps the interior surface 154 of a forward portion 156 of outer combustor panel 110. The exterior surface 138 of inner flange 142 radially overlaps the interior surface 158 of a forward portion 166 of inner combustor panel 112. In various embodiments, outer spacers 130a may receive a forward end 162 of outer combustor panels 110, and inner spacers 130b may receive a forward end 164 of inner combustor panels 112. Stated differently, forward end 162 of outer combustor panels 110 may be located in a groove 155 defined by outer spacer 130a, and forward end 164 of inner combustor panels 112 may be located in a groove 157 defined by inner spacer 130b. Outer spacers 130a are located circumferentially about an outer circumference of bulkhead panel 114 (e.g., radially outward of outer flange 140). Inner spacers 130b are located circumferentially about an inner circumference of bulkhead panel 114 (e.g., radially inward of inner flange 142). In various embodiments, each bulkhead panel segment 132 contacts at least one outer spacer 130a and at least one inner spacer 130b.

In accordance with various embodiments, outer spacers 130a are configured to maintain a radial distance between the exterior surface 138 of outer flange 140 and interior surface 154 of outer combustor panel 110. Inner spacers 130b are configured to maintain a radial distance between the exterior surface 138 of inner flange 142 and the interior surface 158 of inner combustor panel 112. In various embodiments, outer spacer 130a may be configured to apply a biasing force, in a radially inward direction, against outer flange 140, and inner spacer 130b may be configured to apply a biasing force, in a radially outward direction, against inner flange 142. The biasing force applied by outer and inner spacers 130a, 130b may prevent or reduce movement of bulkhead panel 114. For example, outer spacer 130a may be compressed between outer flange 140 and outer combustor panel 110, and inner spacer 130b may be compressed between inner flange 142 and inner combustor panel 112. During operating, thermal expansion of combustor outer and inner shells 104, 108 may increase a distance between interior surface 154 of outer combustor panel 110 and interior surface 158 of inner combustor panel 112. Outer and inner spacers 130a, 130a may decompress in response to the increase in distance between interior surface 154 and interior surface 158, thereby preventing or reducing movement or "rattling" of bulkhead panel 114.

The distance maintained by outer and inner spacers 130a, 130b creates an axial flow path for a cooling flow 172 of cooling fluid (e.g., air bled from compressor section in FIG. 1) to flow between bulkhead panel 114 and outer combustor panel 110 and between bulkhead panel 114 and inner combustor panel 112. In various embodiments, the cooling flow 172 may be provided through effusion openings 174 formed in bulkhead shell 120 and directed at the portion of exterior surface 138 located between OD 150 and ID 152 of bulkhead panel segment 132. In various embodiments, a cooling fluid may also be provided through effusion openings formed in combustor outer shell 104 and directed at the exterior surface 138 of outer flange 140 and/or through effusion openings formed in combustor inner shell 108 and directed at the exterior surface 138 of inner flange 142.

Outer and inner flanges 140, 142 are configured to direct the cooling flow 172 in a generally axial direction. The cooling flow 172 may flow along the interior surfaces of outer and inner combustor panels 110, 112.

The axial length 180 of outer flange 140, as measured from interior surface 136 at OD 150, may be selected based on the radial distance 182 between swirler opening 134 and outer flange 140 and the reverse flow 128a generated by swirler 124. In various embodiments, a ratio of axial length 180 of outer flange 140 to radial distance 182 may be between 0.25:1 and 2:1, or between 0.5:1.0 and 1.5:1. The axial length 184 of inner flange 142, as measured from interior surface 136 at ID 152, may be selected based on the radial distance 186 between swirler opening 134 and inner flange 142 and the reverse flow 128b generated by swirler 124. In various embodiments, a ratio of axial length 184 of inner flange 142 to radial distance 186 may be between 0.25:1 and 2:1, or between 0.5:1.0 and 1.5:1.

The flow direction provided by outer and inner flanges 140, 142 may reduce a likelihood cooling flow 172 will interrupt, redirect, or otherwise impact reverse flow 128a, 128b. Similarly, bulkhead panel 114 being devoid of effusion holes extending between interior surface 136 and exterior surface 138 tends to generate a better and/or more predictable reverse flow 128a, 128b, as compared to bulkhead panels that include effusion openings formed through the interior surface of the bulkhead panel. For example, bulkhead panel 114 tends to generate a better and/or more predictable reverse flow 128a, 128b, as compared to bulkhead panels that include effusion openings formed around the bulkhead panel swirler opening and/or at any other location between the bulkhead panel OD and ID.

Figure 6A:
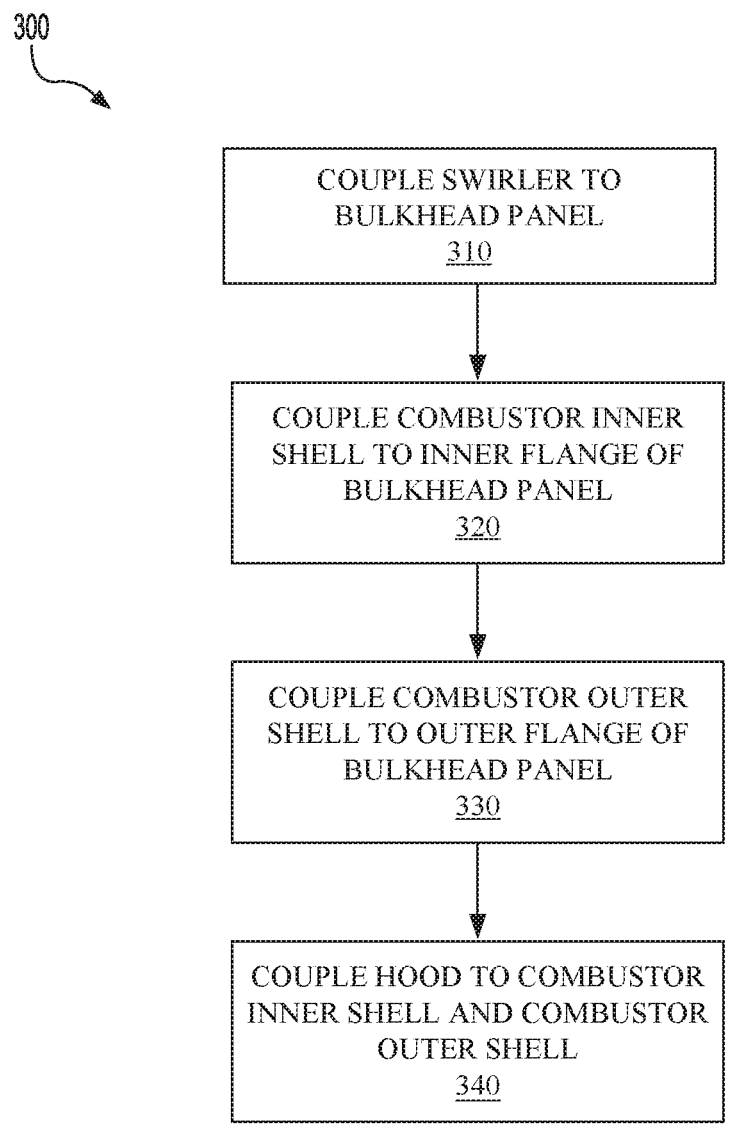
FIGS. 6A and 6B illustrate a method of assembly for a combustor, in accordance with various embodiments.

With reference to FIG. 6A, a method 300 for assembling a combustor is illustrated. method 300 may include coupling a swirler to a bulkhead panel (step 310), coupling a combustor inner shell to an inner flange of the bulkhead panel (step 320), coupling a combustor outer shell to an outer flange of the bulkhead panel (step 330), and coupling a hood the outer combustor shell and the inner combustor shell (step 340)

Figure 5A:
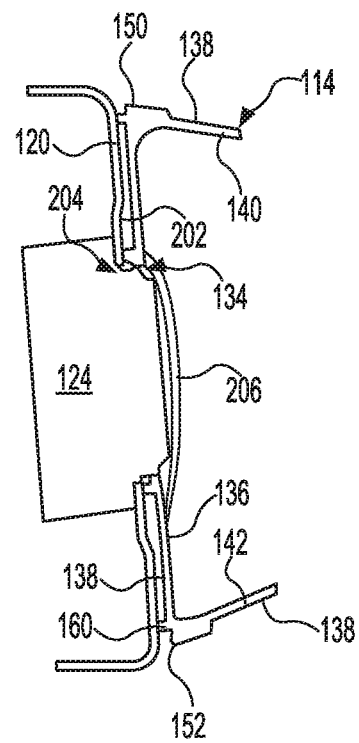
FIGS. 5A, 5B, 5C, and 5D illustrate assembly of a combustor having an extended bulkhead panel, in accordance with various embodiments.
Figure 6B:
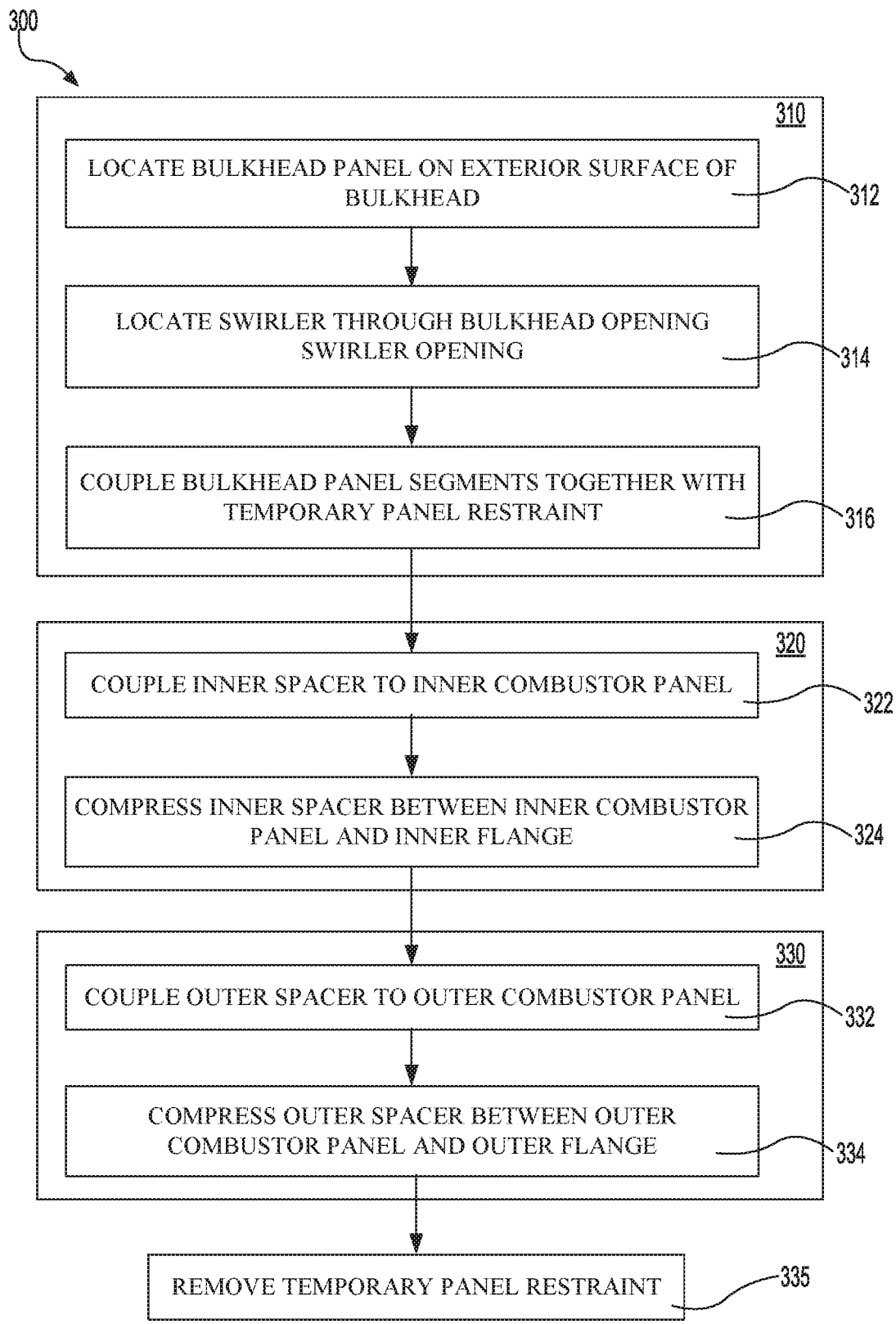

With combined reference to FIG. 5A, FIG. 6A, and FIG. 6B, step 310 may include coupling a swirler 124 to a bulkhead panel 114. In various embodiments, step 310 may include locating bulkhead panel 114 on an exterior surface 202 of bulkhead shell 120 (step 312) and locating the swirler 124 through a shell opening 204 defined by the bulkhead shell 120 and through a swirler opening 134 defined by the bulkhead panel 114 (step 314). In various embodiments, the bulkhead panel 114 includes a plurality of arcuate bulkhead panel segments 132, as shown in FIG. 3A, with arcuate bulkhead panel segment defining a swirler opening 134. In various embodiments, and step 310 may include coupling the plurality of arcuate bulkhead panel segments 132 together using a temporary panel retainer 206 (step 316). Temporary panel retainer 206 may include tape, clips, or any other removeable fastener.

Figure 5B:
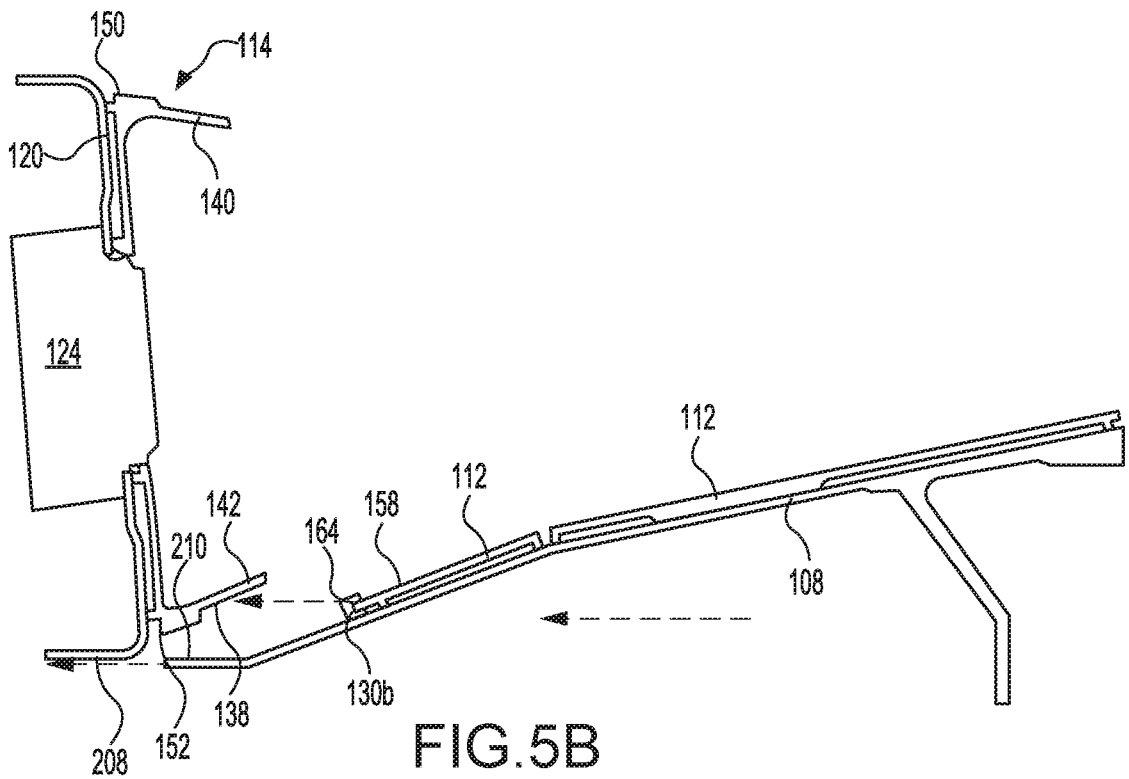

With combined reference to FIG. 5B, FIG. 6A, and FIG. 6B, step 320 may include coupling a combustor inner shell 108 to an inner flange 142 of the bulkhead panel 114. In various embodiments, step 320 may include coupling an inner spacer 130b to a forward end 164 of inner combustor panel 112 (step 322) and compressing the inner spacer 130b between an exterior surface 138 of the inner flange 142 and an interior surface 158 of the inner combustor panel 112 (step 324). While FIG. 5B illustrates inner spacer 130b as coupled to inner combustor panel 112, it is contemplated and understood that in various embodiments, inner spacer 130b may be attached to exterior surface 138 of inner flange 142. Step 320 may include locating an inner bulkhead flange 208 of bulkhead shell 120 on an interior surface 210 of combustor inner shell 108.

Figure 5C:
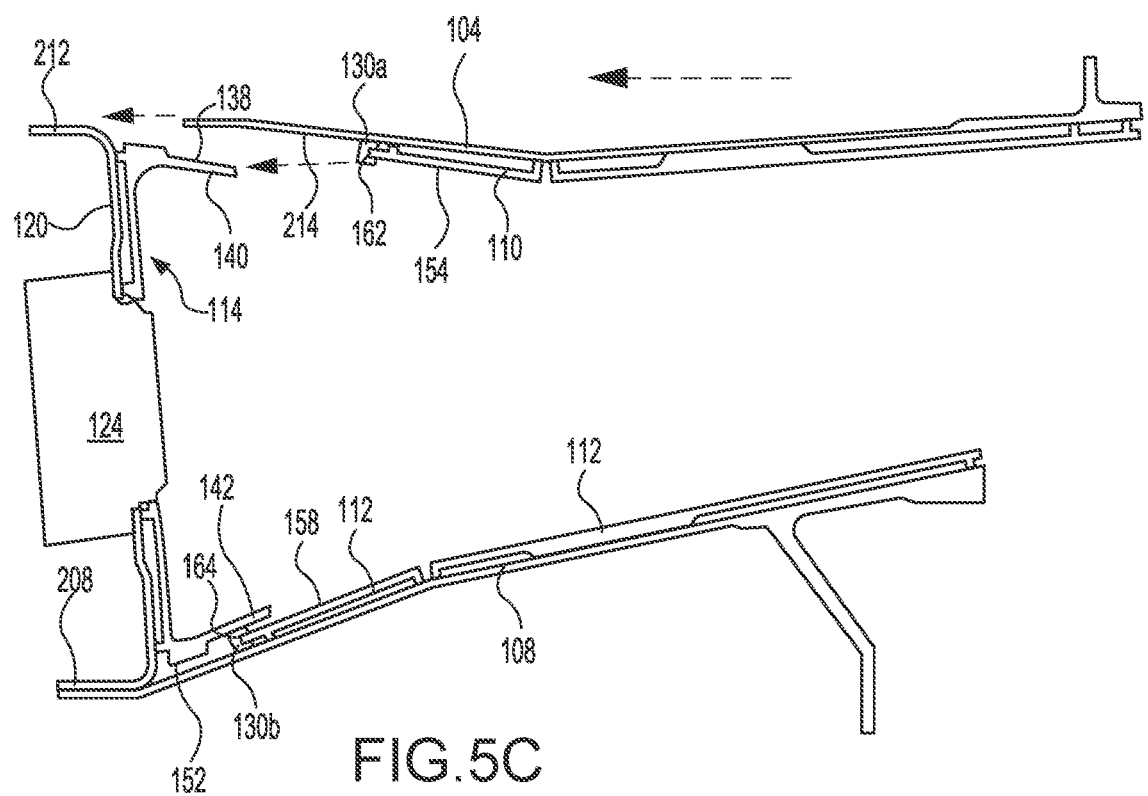

With combined reference to FIG. 5C, FIG. 6A and FIG. 6B, step 330 coupling combustor outer shell 104 to an outer flange 140 of the bulkhead panel 114. In various embodiments, step 330 may include coupling outer spacer 130a to forward end 162 of outer combustor panel 110 (step 332) and compressing outer spacer 130a between exterior surface 138 of outer flange 140 and interior surface 154 of outer combustor panel 110 (step 334). While FIG. 5C illustrates outer spacers 130a as coupled to outer combustor panel 110, it is contemplated and understood that in various embodiments, outer spacer 130a may be attached to exterior surface 138 of outer flange 140. Step 330 may include locating an outer bulkhead flange 212 of bulkhead shell 120 on an interior surface 214 of combustor outer shell 104.

In various embodiments, method 300 may include removing the temporary panel retainer 206 (step 335). In various embodiments, step 335 may be performed after step 330 or between step 320 and step 330 (i.e., prior attaching the combustor outer shell 108 and prior to attaching the combustor outer shell).

Figure 5D:
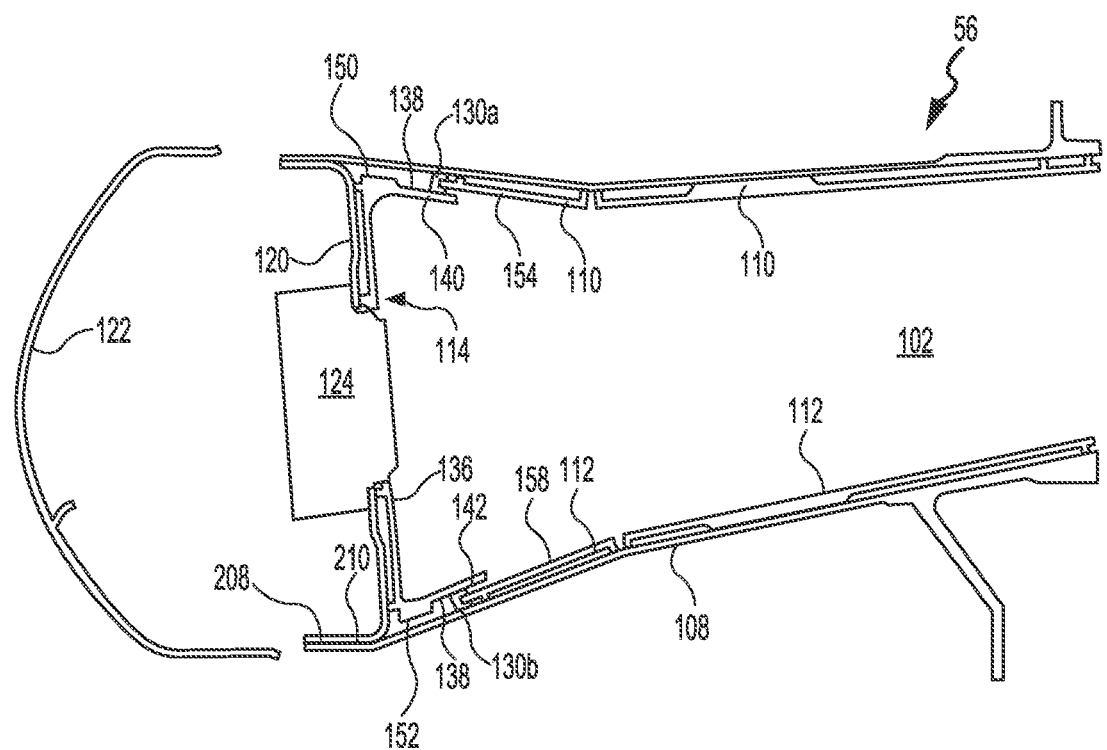

With combined reference to FIG. 5D and FIG. 6A, step 340 include coupling hood 122 to the combustor outer shell 104 and to the combustor inner shell 108. Step 340 may include locating (or sandwiching) the combustor inner shell 108 between the inner bulkhead flange 208 and hood 122 and locating (or sandwiching) the combustor outer shell 104 between the outer bulkhead flange 212 and hood 122.

In accordance with various embodiments, the biasing force applied by outer and inner spacers 130a, 130b, secures bulkhead panel 114 in place. Stated differently, the biasing force applied by outer and inner spacers 130a, 130b is configured to block radial and axial translation of bulkhead panel 114. In this regard, bulkhead panel 114 may be secured within combustion chamber 102 without the use of screws, bolts, rivets, or other fasteners, thereby eliminating the need to form additional fastener openings in the bulkhead panel 114 and/or the risk of the fasteners cracking the bulkhead panel 114. Reducing the risk of fastener induced cracking, may allow the panel to made from materials which are generally more brittle (e.g., CMC), but which have increased thermal resistance. CMC may need less cooling as compared to other materials (e.g., metals), thereby allowing effusion openings to be eliminated from the interior surface 136 of the bulkhead panel 114. Additionally, a CMC bulkhead panel 114 may allow the amount of the cooling flow provided to the bulkhead panel 114 to be decreased, which can increase the amount of cooling flow available for cooling other components of the gas turbine engine.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:
1. A combustor, comprising:
an outer combustor panel;
an inner combustor panel radially inward of the outer combustor panel;
a bulkhead panel extending radially between the outer combustor panel and the inner combustor panel, the bulkhead panel including an outer flange and an inner flange, wherein the outer flange extends axially from an outer diameter of the bulkhead panel and aft from and past an interior surface of the bulkhead panel, and wherein the inner flange extends axially from an inner diameter of the bulkhead panel and aft from and past the interior surface of the bulkhead panel;
an outer spacer contacting and compressed between an exterior surface of the outer flange of the bulkhead panel and an interior surface of the outer combustor panel; and an inner spacer contacting and compressed between an exterior surface of the inner flange of the bulkhead panel and an interior surface of the inner combustor panel, wherein a first forward end of the outer combustor panel is located in a first groove defined by the outer spacer, and wherein a second forward end of the inner combustor panel is located in a second groove defined by the inner spacer.

2. The combustor of claim 1, wherein the outer spacer is configured to apply a first biasing force in a radially inward direction against the exterior surface of the outer flange, and wherein the inner spacer is configured to apply a second biasing force in a radially outward direction against the exterior surface of the inner flange.

3. The combustor of claim 1, wherein the bulkhead panel defines a swirler opening.

4. The combustor of claim 3, wherein the bulkhead panel is formed of a ceramic matrix composite.

5. The combustor of claim 4, wherein the ceramic matrix composite extends continuously and without interruption from the interior surface of the bulkhead panel to an exterior surface of the bulkhead panel and from the swirler opening to an outer perimeter of the bulkhead panel.

6. The combustor of claim 4, wherein at least one of the outer combustor panel or the inner combustor panel is formed of at least one of a nickel based alloy or a cobalt based alloy.

7. The combustor of claim 4, further comprising a bulkhead shell located forward the bulkhead panel, wherein the bulkhead shell defines a plurality of effusion openings configured to direct a flow of fluid toward an exterior surface of the bulkhead panel.

8. The combustor of claim 4, wherein a ratio of an axial length of the outer flange to a radial distance between the outer flange and the swirler opening is between 0.5:1 and 1.5:1.

9. The combustor of claim 1, wherein a first axial flow path is defined between a portion of the exterior surface of the outer flange and a portion of the interior surface of the outer combustor panel, wherein the portion of the exterior surface of the outer flange radially overlaps the portion of the interior surface of the outer combustor panel, and wherein the outer spacer is configured to maintain a first radial distance between the portion of the exterior surface of the outer flange and the portion of the interior surface of the outer combustor panel.

10. The combustor of claim 9, wherein a second axial flow path is defined between a portion of the exterior surface of the inner flange and a portion of the interior surface of the inner combustor panel, wherein the portion of the exterior surface of the inner flange radially overlaps the portion of the interior surface of the inner combustor panel, and wherein the inner spacer is configured to maintain a second radial distance between the exterior surface of the inner flange and the interior surface of the inner combustor panel.

* * * * *